UNITED STATES PATENT OFFICE.

LEO W. GEISLER, JR., OF NEW YORK, N. Y.

TREATMENT OF COFFEE.

1,015,271.  Specification of Letters Patent.  Patented Jan. 16, 1912.

No Drawing.  Application filed December 3, 1909. Serial No. 531,222.

*To all whom it may concern:*

Be it known that I, LEO W. GEISLER, Jr., a citizen of the United States, and a resident of the borough of Manhattan of the city of New York, in the county and State of New York, have invented certain new and useful Improvements in the Treatment of Coffee, of which the following is a specification.

The object of the invention is to extract from the coffee its caffein constituent without destroying the aroma or flavor of the coffee or otherwise affecting the same, and also to derive the caffein from the extracted portion.

Broadly speaking, my invention consists in boiling the caffein out of the green coffee beans, extracting the caffein from the liquid obtained after the boiling, and then treating the coffee beans with said liquid after the caffein has been extracted. I have discovered, however, that it is desirable to boil the coffee beans at least twice, that is in two separate installments of liquid, for in this way the extraction of caffein I find can be most completely effected; but that in the subsequent treatment of the coffee beans with the decaffeinized liquor, that obtained from the first boiling is sufficient to employ.

In carrying out my improvements, I place the coffee beans to be treated in a vat and add thereto substantially four parts of water for each part of coffee and bring the same to a boil which I allow to continue for about two hours. Then I decant the liquor and again add to the vat a like quantity of water and boil for about an hour. It is preferable to add, moreover, to the vat, upon the second boiling, a small quantity of borax, as this serves to make the residual caffein more easily soluble. After the second boiling the liquor is again drawn off or decanted, and the liquor obtained from the first boiling, after being deprived of its contained caffein, is added to the vat and the coffee is allowed to soak therein for several hours, say, over night. This serves to permit any aromatic ingredients which may have been removed from the coffee upon the first boiling, to be reabsorbed by the coffee again to a considerable extent. Thereafter, the coffee beans are allowed to dry in any suitable manner and may then be roasted.

The decaffeinizing of the liquor and the recovery of the caffein, which constitutes the complementary part of the improved process, may be carried on as follows: To the liquor from the first boiling is added a small quantity of dilute sulfuric acid (say about 2 ozs. for every 15 pounds of coffee treated). After the liquor has now been well stirred, a sufficient quantity of chloroform is added to dissolve out the caffein. It is preferable to add the chloroform in at least two instalments (in all about a pint for every 15 lbs. of coffee treated), stirring well after adding each instalment of chloroform, and then allowing the latter to settle and drawing it off. The liquor left after the chloroform has been drawn off is then ready to be added to the coffee beans, as specified above.

To recover the caffein which has been dissolved out of the liquor from the first boiling, as just described, the chloroform is simply distilled off, leaving the caffein as a residue. In addition to this, however, the liquor remaining in the vat after the soaking of the coffee beans, is united with the liquor from the second boiling and these liquors are concentrated by being boiled down. Then, basic lead acetate is added to throw down any vegetable matter contained therein. Finally, chloroform is added and any contained caffein is dissolved out and recovered, as before.

It will be obvious that various departures may be made from the process as herein described, while still retaining the spirit of the invention. Moreover, it will be understood that the decaffeinizing of the coffee is entirely independent of the recovery of the caffein and either may be practiced in accordance with the invention without completing the other. And it will be understood that the solvents and reagents specified in the foregoing treatment may be replaced by others.

I claim as my invention:

1. The treatment of coffee which consists in boiling the green coffee in two different lots of water, withdrawing both lots, removing the caffein from that lot of water in which the coffee is first boiled then soaking the coffee in liquid from which caffein has been removed and after the soaking withdrawing the liquid remaining with the coffee.

2. The treatment of green coffee which consists in boiling in water the same to remove the caffein constituent, extracting the caffein constituent from the liquor after such boiling, boiling the coffee a second time, and soaking the coffee thereafter in the liquor obtained from the first boiling and from which the caffein has been extracted.

3. The treatment of coffee which consists in boiling the same before roasting for about two hours in about four times the amount of water to remove the caffein constituent, extracting the caffein constituent from the liquor after such boiling, boiling the coffee in another like quantity of water for about one hour, and subjecting the coffee to the action of the decaffeinized liquor from the first boiling for several hours.

4. The treatment of green coffee which consists in boiling the same in water to remove the caffein constituents, extracting the caffein from the liquid after such boiling, boiling a second time, boiling down the liquor from the second boiling and extracting the caffein therefrom and soaking the coffee thereafter in the liquors obtained from the first and second boiling and from which the caffein has been extracted.

5. The treatment of coffee which consists in boiling the same before roasting, for about two hours in about four times the amount of water to remove the caffein constituent, extracting the caffein constituent from the liquor after such boiling, boiling the coffee in another like quantity of water for about one hour and later decaffeinizing the liquor of the second boiling, and subject the coffee to the action of the decaffeinized liquors from the first and second boiling for several hours.

This specification signed and witnessed this 2nd day of December, A. D., 1909.

LEO W. GEISLER, Jr.

Signed in the presence of—
Lewis E. Varney,
G. McGrann.